Figure 1:
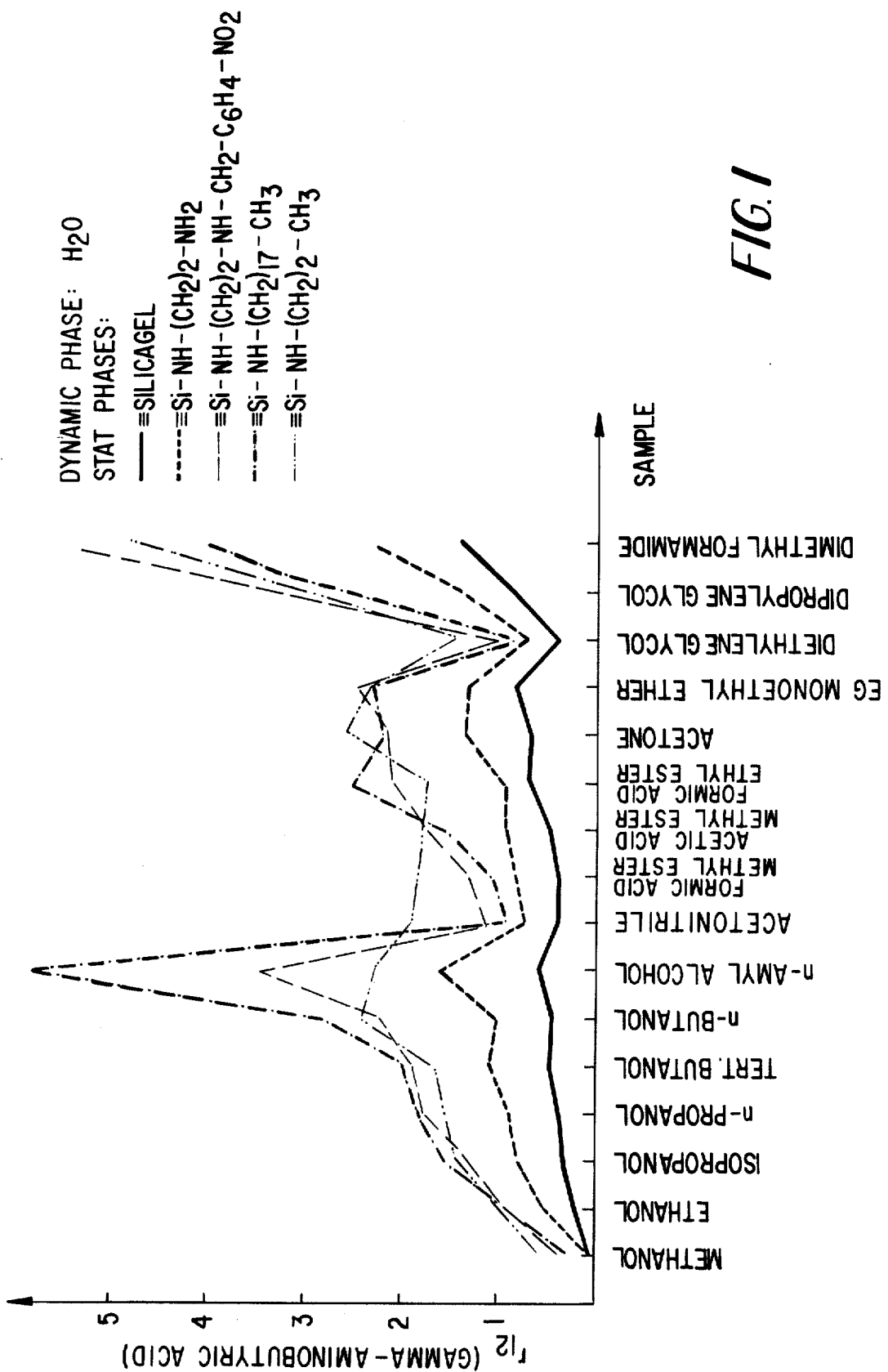

United States Patent [19]

Halasz et al.

[11] 3,892,678

[45] July 1, 1975

[54] POROUS SILICON DIOXIDE-BASED ADSORBENTS FOR CHROMATOGRAPHY AND PROCESSES FOR THEIR MANUFACTURE

[75] Inventors: Istvan Halasz, Saarbrucken; Otto-Ernst Brust; Imrich Sebestian, both of Dudweiler, Saar, all of Germany

[73] Assignee: Istvan Halasz, Saarbrucken, Germany

[22] Filed: July 16, 1973

[21] Appl. No.: 379,705

[30] Foreign Application Priority Data

July 27, 1972  Germany............................ 2236862

[52] U.S. Cl................ 252/426; 260/448.8 AS; 260/448.2 N; 260/46.5 E
[51] Int. Cl............................................ B01j 31/02
[58] Field of Search............ 252/426; 260/448.8 AS, 260/448.2 N, 46.5 E

[56] References Cited
UNITED STATES PATENTS

| | | | |
|---|---|---|---|
| 2,348,072 | 5/1944 | Kanhofer | 260/448.8 AS X |
| 2,689,245 | 9/1954 | Merrill | 260/448.2 N X |
| 3,116,161 | 12/1963 | Purnell | 260/46.5 E X |
| 3,259,518 | 7/1966 | Sterman et al. | 260/46.5 E X |
| 3,664,967 | 5/1972 | Stehl | 252/426 X |
| 3,734,936 | 5/1973 | Brown et al. | 260/46.5 E X |

OTHER PUBLICATIONS

"Helvetica Chimica Acta," 33, p. 1231, 1950.
"Trans. Faraday Soc.," 57, pp. 2000–2006, 1961.

*Primary Examiner*—Paul F. Shaver
*Attorney, Agent, or Firm*—Gardiner, Sixbey, Bradford and Carlson

[57] ABSTRACT

The surfaces of porous silicon dioxide chromatographic adsorption means are altered by chemical reaction of silanol groups with primary or secondary aliphatic or araliphatic amines having at least two carbon atoms and containing no functional groups as substituents that might competitively react with respect to the amino groups. The amines are preferably substituted in the omega-position with at least one non-competitive functional group. Such terminal functional groups may subsequently be reacted with compounds which further alter the surface to provide optimal surface groups in the stationary phase for given separation and chromatographic problems.

10 Claims, 2 Drawing Figures

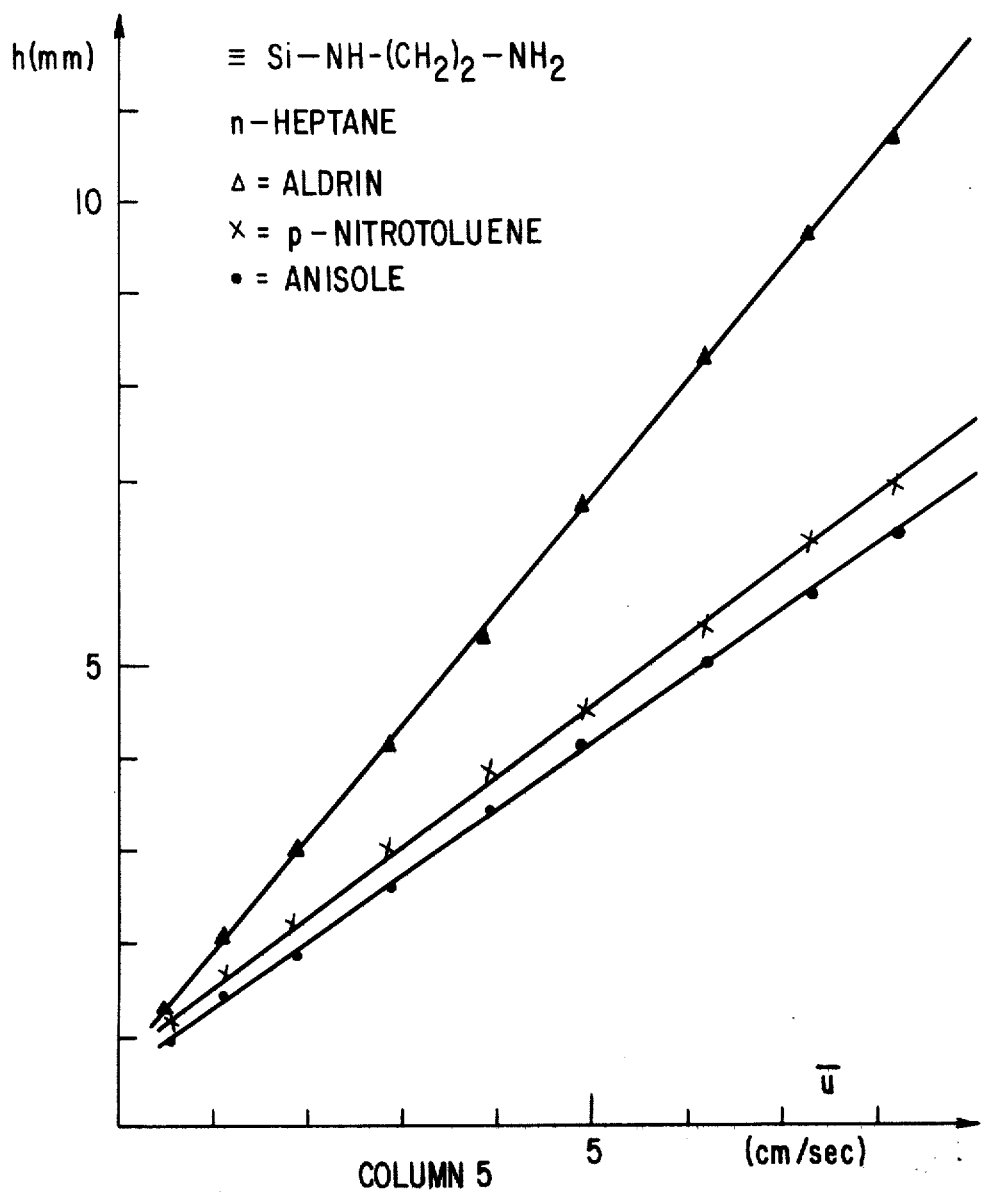

3,892,678

POROUS SILICON DIOXIDE-BASED ADSORBENTS FOR CHROMATOGRAPHY AND PROCESSES FOR THEIR MANUFACTURE

This invention relates to new stationary phases for chromatography. Adsorbents are used in chromatographic separations wherein they act reciprocally in stationary phases with a test sample (gas or liquid), thus causing a separation of the components of the non-stationary phase.

The use of porous, inorganic adsorbents, in particular silicon dioxide, for carrying out chromatographic separations is known. These adsorbing means, however, are suitable only to a limited degree because of their high activities, at least as regards many separation problems. Therefore, many attempts have already been undertaken in order to alter the surface of the silicon dioxides. It is true that by varying the pore structure, the chromatographic behavior of silicon dioxide may be changed; however, the interfering influence from the acid silanol groups may only be reduced by modifying the surface by organic reagents. Two basically different methods are used: on one hand the silicon dioxide may be coated with liquid stationary phases without there being chemical combination (for instance, heavily loaded columns), on the other hand conversion of the silanol groups may be with organic reagents, the entire OH group or only the H being substituted. Thus, by means of silane-izing, alkyl- and arylsilyl radicals may be bonded to the surface.

Chlorinating the silicon dioxide surface provides another possibility of modification. The resulting Si-Cl groups may be reacted further with lithium-organic compounds of Grignard-reagents. The silanol groups may be esterified with alcohols to form SiOC bonds. The stationary phases so represented, however, suffer from the drawback, as regards chromatography, of only containing alkyl-aryl radicals at the surface, so that such modification will cause only deactivation of the silicon dioxide surface. However, chromatography preferentially requires functional surface groups such as —CN, —COOH, —NO$_2$, —SO$_3$H, and —NH$_2$. As described for instance in German Patent No. 1,902,226, such groups may be introduced by esterifying the silanol groups with appropriately substituted alcohols or by further reaction by linking the radicals onto the SiOC bonds; such phases, however, will not be hydrolysis-resistant and, therefore, are suitable only to a limited extend for chromatography. Water or aqueous elements may not be used as dynamic phases when this adsorption means is used.

Now it has been found that one may achieve hydrolysis-resistant, stationary phases for chromatography if the surface of silicon dioxide is so modified that SiN bonds occur at the surface. Multiple applicable chromatographic adsorption means are obtained in this manner.

It is true that a clay mineral, montmorillonite, has been reacted with chlorine for structural clarification and then with ethylene diamine accompanied by SiN bond formation (*Helvetica Chimica Acta*, Vol. 33, p. 1231, 1950). This product, besides being described as fairly unstable, is entirely unsuited as a stationary phase for chromatography because the unfavorable mechanical properties of montmorillonite prohibit such application, especially with respect to column chromatography. Furthermore, montmorillonite possesses a laminar structure rather than the indispensable pore structure required for chromatography.

It is further known (*Trans. Faraday Soc.*, 57, pp. 2000-6, 1961) how to bond ammonium to a chlorinated, porous glass while forming surface Si-NH$_2$ groups. However, these modified silicon dioxides are unsuited for chromatography on account of the strong reciprocal actions between the sample molecules adsorbed and the surface.

The object of the invention, therefore, covers chromatographic adsorption means based on porous silicon dioxide having a surface altered by chemical reaction of silanol groups, so characterized that substituted aliphatic or araliphatic amines having at least 2 C atoms are bonded to the surface and are linked via their amino group by a Si-N linkage. Preferably, these amines are substituted with at least one additional functional group, if possible, arranged in the omega-position.

Further objects of the invention are processes for the manufacture of adsorbents for chromatography based on silicon dioxides having surfaces modified by chemical conversion with silanol groups, the process essentially consisting in halogenating porous silicon dioxide, preferably chlorinating in manners known in the art, and in reacting the products obtained with a substituted aliphatic or araliphatic amine having at least 2 C atoms, the amine not being substituted by such functional groups as might competitively react, with respect to the amino groups, with the surface halogen atoms.

According to the process of the invention, any porous silicon dioxide may be modified with possesses acid silanol groups at the surface. By porous silicon dioxide is meant not only silicon dioxide which is porous throughout, but also such as is deposited in thin layers, for instance, in the form of colloidal silica on substrates such as glass, ceramics, natural silicates, etc. Etched glass, too, in the broadest sense, falls within the concept of porous silicon dioxide. The specific surface of a silicon dioxide should be at least 100 cm$^2$/g, and the pore diameter should be at least 30 A. The particle size should be less than 1 mm, at least, if silicon dioxide is used as such. Further data concerning silicon dioxides which can be modified will be found in columns 5 and 6 of German Pat. No. 1,902,226.

The silanol groups of such silicon dioxides are then converted in known manner by halogenation, preferably chlorination, into Si—Cl groups. The literature shows that only about half of the silanol groups may be converted into Si—Cl groups. On account of easy removal of the reaction products, thionyl chloride is preferred for this reaction. First the silicon dioxide is dried at fairly high temperatures (about 200°C) for several hours for the purpose of removing the water adsorbed at the surface. Then, preventing air humidity from being a factor, thionyl chloride is allowed to react for several hours. Excess thionyl chloride and the gaseous reaction products SO$_2$ and HCl are removed by heating at decreased pressure. The product is stored while excluding air humidity.

The chlorinated silicon dioxide so obtained is reacted, if necessary, in the presence of organic solvents, in a manner known in the art, with aliphatic or araliphatic amines having at least two C atoms which may be substituted by an additional functional group.

The amines suitable for manufacturing the stationary phases of the invention are primary or secondary aliphatic or araliphatic amines with from 2 to 20 C atoms. The bonding between the Si-Cl groups and the amines occurs via the amino group. The amines may be altered by various substituents, such as by functional as well as by inert groups. A chain length of at least 2 C atoms is essential. The functional groups in these amines should preferably be arranged in the omega-position with respect to the amino group, thus reducing any adverse effects from these functional groups on the SiN bonds or eliminating them altogether. Also, terminal functional groups are more advantageous for separation in chromatography because interactions of the sample molecules with the functional groups are thereby alleviated and repressed with respect to the silicon dioxide. One should further try to use only such amines the additional functional groups of which cannot react with the Si—Cl groups because, otherwise, one cannot be sure that there will be exclusive formation of SiN bonds. In particular, one should not use amino alcohols. As for the rest, however, any amine may be arbitrarily substituted since the stationary phases generated in this manner may then be adapted to differentiate various separation problems. It is not absolutely necessary that the substituents be only functional groups; in principle, inert substituents may also be present, for instance, aryl residues, which may contribute to the absorption properties of the stationary phases of the invention on account of their own substituents (for example, $NO_2$).

Of the large number of amines which may be considered, the following will be listed as examples: mono— and diethyl amine; mono— and dipropyl amine; mono— and dibutyl amine; mono— and dipentyl amine and also the higher homologues with up to 20 C atoms. The symmetrical amines are preferred because of their easier accessibility, but secondary amines such as N-methyl-N-octyl amine, N-ethyl-N-dodecyl amine, N-butyl-N-octadecyl amine, N-methyl-N-isopropyl amine, 3-ethoxypropyl amine, N-ethyl-N-isobutyl amine, N-methyl-N-octadecyl amine, N-cetyl-N-methyl amine, N-methyl and N-ethyl benzyl amine may also be used. Unsaturated amines also are suitable, for instance, allyl amine or crotyl amine.

Derivatives with additional amino groups or with —CN, —$SO_3H$, halogen, —COOH or —$NO_2$ substituents are preferred among the amines with additional functional groups. In many cases such groups hold particular interest as being designated as ion exchange groups, for example, of the —$NH_2$, —N—(alkyl)$_2$, quartary ammonium or —$SO_3H$ type. The inherent number of substituents is not limited because the linkage occurs only via the SiN bond. Thus, the amino radicals are restricted only by the availability of the initial materials and, if necessary, by the yields that may be achieved, too bulky radicals providing poor yields because of volumetric obstacles.

Diamines are particularly well suited for reactions which are supposed to provide further alterations of the radicals linked via the SiN bond. In principle, all diamines and also compounds with several amino groups are well suited, but the conversion itself is particularly simple to perform with diamines whose chain contains not more than 6 C atoms, ethylene diamine being preferred for this purpose. Particularly good yields are obtained with this amine because cyclical bonds are impossible and because the radical linked via the SiN bond contains an amino group with excellent properties for additional conversions. Besides ehtylene diamine, particularly well accessible amines such as hexamethylene diamine, tri—, tetra—, penta— and octamethylene diamines may be considered; the higher homologues such as 1,18-diamino-n-octadecane or diamines with branched hydrocarbon chains may also be used. Other examples are 3-ethylamino-1-propyl amine, diethylene triamine and N-N-dimethyl ethylene diamine. The basicity of the diamines increases with remoteness of both groups.

Other amines with functional groups that may be successfully used are, for example: $NH_2—(CH_2)_2—SO_3H$; $NH_2—(CH_2)_6—SO_3H$; $NH_2—(CH_2)_3—COOH$; $NH_2—(CH_2)_{10}—COOH$ and $NH(CH_3)—(CH_2)_2—CN$;

$H_2N-(CH_2)_2-$ /  $-NO_2$ or $H_2N-(CH_2)_2-$ / $-Cl$.

Also, applicable are: 3-aminopropane sulfonic acid, 4-aminobutyric acid ethyl ester, 6-aminocaproic acid and beta-aminopropionitrile.

The conversion to the amine of the Si—Cl group-containing silicon dioxides is performed according to methods known in the literature. All solvents may be used that exclude a reaction with the Si—Cl groups. Therefore, water, alcohols, and solvents with —COOH or anhydride groups are unsuitable. Preferred organic solvents are ether, dimethyl sulfoxide and hydrocarbons, such as for instance, diethyl ether, dioxane and heptane. In many cases, however, the amines themselves may act as solvents. As a rule, the conversion occurs at temperatures between 60° and 100°C or at the boiling point of the solvent being used to the extent that there is reflux. The reaction times roughly fall between 4 and 24 hours. All conversions are performed in the absence of air humidity. Diethyl ether is a preferred solvent for reactions where the amines lack functional groups and for diamines (to the extent a solvent is added at all). Conversion with amines containing the —$SO_3H$ or —COOH groups preferably occurs in dimethyl sulfoxide. The betaine structure formed by polar solvents of such compounds will be repressed by this solvent and reduction in reactivity towards the Si—Cl groups is avoided.

Following conversion, the mixture will be treated with alcohol and alcohol/water, for instance, approximately 1:1, and thus be rid of non-converted materials. The non-converted Si—Cl groups at the same time will be hydrolized to silanol groups. If necessary, ether rinsing will follow, and drying will be performed preferably under reduced pressure and at increased temperatures, for instance, at about 60°–100°C and 0.1 torr.

As already mentioned, the stationary phases so obtained and containing functional groups in the surface substituents, may be reacted further. In this manner one may select the optimal groups in the stationary phase for a given separation problem. Alkylene diamines bonded to the surface, in particular, may be easily converted further. In principle, all reactions may be carried out by such terminal amino groups for these amino groups are also suited in other respects. The possible reactions are limited only by the SiN bond which may not be attacked for the selected reaction conditions. The conversions themselves occur in accordance with the processes known from the literature.

Only the following will be mentioned from the large group of compounds that may be used:

a. Halides, which are preferred because of their superior accessibility as regards starting materials, including the chlorides and bromides, for example, the alkyl—, aryl—, and aralkyl halides with functional and preferably omega-positioned substituents such as $Br(CH_2)_2CN$, $Cl(CH_2)_6CN$, p-cyanbenzyl bromide/chloride, p-chloro-m-nitrobenzene, p-nitrobenzyl chloride/bromide, chloroacetonitrile, 3-chloropropionic acid, 4-chlorobutyronitrile, 3-chloro-1-nitropropane, 2-bromoethane sulfonic acid/Na-salt (solvent: dimethyl sulfoxide), 5-bromovaleronitrile, picryl chloride, 1-chloro-2,4-dinitrobenzene, 4-chlorobenzyl cyanide, 4-bromobenzonitrile, 4-chlorobenzoic acid, 4-bromobenzophenone or 4(p-chlorobenzyl)-pyridine.

As a rule, the halides are added in excess. Solvents are, for instance, ether, heptane, dioxane or dimethyl sulfoxide. The reaction times are from 2 to 12 hours, the reaction temperatures being near or below the boiling points of the solvents used. Finishing is similar to the methods indicated for the amino radical connection.

b. Carbonyl compounds, especially aldehydes and ketones. Aromatic, aliphatic and araliphatic carbonyl compounds may be used in this instance too and also dicarbonyl compounds. Conversion by means of aromatic carbonyl compounds is particularly advantageous because the structure of the reaction products will then be set. Enamines may form when converting by means of aliphatic or araliphatic carbonyl compounds. As an illustration, the following carbonyl compounds may be used: acetylacetone, benzoylacetone, acetylbenzoyl, benzaldehyde, 4-nitrobenzaldehyde, 2,4-dinitrobenzaldehyde, 4-cyanopropionaldehyde, 4-cyano-2,2-dimethylbutyraldehyde, pyrinaldehyde and 3-pyrrolaldehyde.

The conversion occurs similarly to the known formation of Schiff bases. Solvents to be used may be hydrocarbons such as benzene, toluene or heptane. Dioxane too is particularly well suited for the conversion of the aromatic aldehydes.

c. Unsaturated compounds may be joined to the amino group in a kind of Michael Addition. One may add acrylonitrile in this manner. Dioxane is a suitable solvent.

d. Acid chlorides and acid anhydrides, from the aliphatic as well as from the aromatic series, may be reacted by means of the amino group. As a rule, the reactions occur without solvents or with solvents such as dioxane or ether. Reaction components, for instance, are benzoyl chloride or acetane anhydride.

e. One may, in addition, undertake quaternization of the amino group, thus obtaining desirable functional groups. The conditions for the reactions are similar to those under (a) except that the halide amounts are correspondingly increased. Furthermore, in this instance halides without functional groups are preferred, for instance, methyl iodide. Nitromethane is a well suited solvent. The reaction at room temperature takes about 12 hours.

f. Furthermore, the terminal amino groups may be converted by means of isocyanates to form urea derivatives. Thus, one may use phenyl isocyanate directly without a solvent (reaction time is about 6 hours at room temperature).

The adsorption means of the invention may additionally be altered by subsequently introducing such substances as sulfonic acid groups. The conversion occurs in a conventional manner, that is, with chlorosulfonic acid in chloroform. This sulfonation is particularly advantageous for products with terminal aryl radicals, preferably phenyl radicals. The products so obtained then possess ion exchange groups. As is known with respect to liquid chromatography, typical ion exchange groups may lead to loose formations of complexes with individual sample substances so that the selectivity of the stationary phase will be increased.

Furthermore, the radicals linked by means of the SiN bonds may be further developed by polymerisation. Those modified silicon dioxides are particularly suitable which contain unsaturated radicals. These reactive double bonds react very readily, particularly in the presence of known polymerisation catalysts, with other polymerisable compounds such as styrene, butadiene, vinyl compounds, acrylates and methacrylates. Ethylene oxide and propylene oxide too may be used for the reaction. The loading capacity of the adsorption means may in this manner be generally increased.

The new adsorption means have been analyzed so as to describe them.

Only limited and approximately quantitative conclusions may be drawn, as well as qualitative ones, concerning the organic compounds bound to the surface of the silicon dioxide because the usual testing methods cannot be used. Use is made in this instance of elementary analysis values in percent C and N and of results from methyl red adsorption. By means of more or less pronounced yellow and red dyeing the methyl red adsorption, the new stationary phases indicate a behavior corresponding to the particular valency values and basicity of the bound radicals. The basic character of the surface is strongest for the phase modified by ethylene diamine.

Amines of different chemical constitutions indicate different reactivities with respect to the Si—Cl groups, which is plausible on volumetric grounds and because of the different basicities of the amines used.

The investigation of the new stationary phases by means of methyl red adsorption complements the results obtained from elementary analysis. One must, however, consider that steric effects do also occur. Phases of relatively minor surface coating but of voluminous organic groupings show no or relatively little methyl red adsorption by their shielding action with respect to converted silanol groups, as compared to what is to be expected from the degree of conversion. On the other hand, one must naturally take into account that basic or acid groups contained as functional groups will affect the reaction with methyl red.

When treating the phases over a fairly long period of time with organic solvents (such as ethanol, benzene and dioxane), water and buffer solutions with a pH from 5 to 7, no changes in the surface radicals can be observed nor any detaching of them and hence any splitting of the SiN bond. Only for pH values less than 4 is it possible to conclude, by means of methyl red adsorption and analytical results, that there is incipient splitting of the SiN bond or an effect on the functional group within the adsorption means. For pH values in excess of 8, one may observe complete splitting of the surface radicals under the influence of bases such as alkalies and simultaneous attack on their functional groups.

The temperature stability of the new stationary phases can be tested by means of gas chromatography. Following conditioning of the columns in nitrogen streams from 120° to 140°C, at 120°C if the linear flow rate of the dynamic phase is 6 cm/sec, the relative retention, the capacity ratio, and the relative peak broadening can be determined and compared with one another. The test substances are n-hexane, benzene and diethyl ether.

Furthermore, the applicability testing of the new stationary phases can be performed according to conventional methods of rapid liquid chromatography. Purified copper tubes are used as columns (inner diameter 2 mm, length approximately 50 cm). The filling with a stationary phase restricted to a sieve fraction from 56 to 90 microns is performed in steps. Stationary phase measurements are performed with n-heptane, methanol and distilled water. Prior to each series of measurements, coiled columns of an approximate radius of 8 cm are conditioned with eluents which, for the time being, serve as the dynamic phase, in order to remove foreign molecules adsorbed on the surface and, consequently, to eliminate adulterations during the measurements. Independent of the eluents, the permeability values within justifiable error limits are determined for all columns. The adsorption properties of the surface groups as well as the kinetic data for the stationary phases are determined and compared from samples of different chemical constitution or polarity and amenability to polarization for the silicon dioxide before and after the modification of the invention. For solid substances, n-heptane, methanol and aqueous saturated solutions are employed as dynamic phases. In order to prevent errors due to overloading the column, the liquid components, if necessary, can be dissolved in the eluent. The results show the superiority of the new phases for the most diverse separation problems.

As contrasted with the previously known adsorbents having SiOC bonds, now water and aqueous eluents may also be used as eluents. It is further of considerable advantage that the desired functional groups for a particular separation problem may henceforth be introduced with ease. For instance, mixtures of n-butanol, n-amyl alcohol and acetonitirile with water as the dynamic phase may not be separated by means of the previously known adsorbents. When using a stationary phase of this invention having surface Si—NH—(CH$_2$)$_{17}$—CH$_3$ groups, however, one does obtain clear peaks, particularly for n-amyl alcohol, so that unambiguous determination and separation are feasible. This illustration shows that the kind of modification of the silicon dioxide surface may be adapted precisely to a given separation problem.

It is furthermore of great advantage that the new stationary phases allow separation of oxygenic compounds, a gas chromatographic separation which is not possible at all when using silica gel, for instance.

The new phases, moreover, are of particular advantage when carrying out gas chromatography at higher temperatures because the vapor pressure of the stationary phases are practically equal to zero and because this zero line does not vary. Also, there is no contamination by the stationary phases of the substances to be tested during the prepscale gas chromatography. The same applies also to liquid chromatography, the stationary phase not being affected and, therefore, no capable of adversely affecting the chromatographic se ration. There is, therefore, no danger in prepscale wor of the products being contaminated by the stationary phase.

Another great advantage consists in the feasibility of arbitrarily changing the dynamic, liquid phase during chromatography; this is impossible, for example, with unmodified silica gel since, in contrast to the new modified phases, it will swell in water or in aqueous solvents.

When modifying the silicon dioxide surface while maintaining apolar surface groupings, stationary phases may be obtained, according to the invention, wherein the test samples may be separated according to their polarity. When using water as the dynamic phase, the alcohols with, for instance, 1 to 5 C atoms will show increasing relative retention with decreasing polarity.

It has been shown, furthermore, that if n-heptane, for example, is used as the dynamic phase, particularly for the silicon dioxide modification of the invention with short radicals, clear partial improvement in the mass transport times with respect to unmodified silicon dioxides will be obtained. Also, the new phases will increase the number of effective plates per unit time as compared with the classical columns supplied with liquid. This is shown even more distinctly by the theoretical number of plates per unit time. Lastly, the excellent fluidity of the new stationary phases allows better column packing, which in turn allows better separations.

It must furthermore be emphasized that from the values that may be computed from the tables contained in the following examples ($h$, $k'$, $r_{12}$, $\bar{u}$, and $d_\mu$), the selectively of the stationary phases may, on the one hand, be widely varied and, on the other hand, the speed of analysis is very favorable, particularly if one takes into account the unusually large particle sizes (56–90 microns) in the liquid chromatography. The advantage of large particles is the favorable, that is, high, permeability (K about $2 \times 10^{-8} cm^2$) of the column, so that for a given column length and speed, the pressure gradient in the column may be kept fairly small.

The variable selectivity of the stationary phases of the invention is illustrated in FIG. 1. The relative retention, $r_{12}$, for gamma-aminobutyric acid is plotted against arbitrarily selected but widely dispersed test substances. The selectivity of adsorbents of the invention is another parameter in this figure. FIG. 1 shows that the relative retentions obtained from silica gel are essentially changed by the introduction of the functional groups of the invention and that they are varied over wide ranges.

FIG. 2 shows the height equivalent of a theoretical plate, $h$, as a function of the speed, $\bar{u}$, which is averaged over the cross-section. It must be noted that the $\bar{u}/h$ values for determining the speed of analysis are very favorable if the particle sizes and, therefore, the permeability are simultaneously taken into account. This is a consequence of the high mass transport speed of the sample molecules in the stationary phases of the invention.

The new adsorbents are to be used in chromatography, both in the liquid and gas chromatography. They are particularly well suited for the packing of columns; however, coated chromatograms too (coated plates or ) may be obtained from them. Particular advan s are obtained when making use of columns since he n dioxide is especially mechanically resistant; this applies also in high degree to silicon dioxide products containing modified, porous SiO$_2$ in a thin layer on a rigid, non-porous substrate.

EXAMPLE 1 a. 100 gm of silicon dioxide (silica gel, specific surface of 370 m²/g, average pore diameter of 80 A, pore volume of 0.8 ml/g, particle size of 56–90 microns) are refluxed under exclusion of air humidity for about 7 hours with 150 ml of thionyl chloride previously distilled over linseed oil and quinoline. The chlorinated product is freed at reduced pressure (0.1 torr) and at 160°–180°C of excess thionyl chloride and also of the reaction products, $SO_2$ and HCl. Excluding air humidity, the hydrolysis-sensitive product is then stored.

b. 2 gm of octadecyl amine dissolved in 40 ml of anhydrous diethyl ether are added to 10 gm of the chlorinated silica gel and boiled under reflux for 6 hours while excluding air humidity. The product is then repeatedly rinsed with ethanol, water, again ethanol and diethyl ether and dried under a vacuum of 0.1 torr at about 80°C.

This product having $Si-NH-(CH_2)_{17}-CH_3$ surface groups contains 0.85% C and 1.2% N. In a similar manner, by converting with 1.5 gm of n-propyl amine, one obtains a product containing 1.5% C and 0.4% N.

$c_1$. Both stationary phases show similar behaviors in chromatography. Tables 1 and 2 indicate the excellent separation capabilities of the new adsorbents.

The symbols below are used in the following tables:
L = column length
i.D. = inner diameter of the column
$d_\mu$ = particle size of the stationary phase
K = specific permeability
T = temperature
$\eta$ = dynamic phase viscosity
p = pressure
$\bar{u}$ = linear flow rate of the dynamic phase
k' = capacity ratio
h = relative peak broadening
$r_{12}$ = ratio of capacity ratios of the two samples

Table 1

Stationary Phase: $-Si-NH-(CH_2)_2-CH_3$
Dynamic Phase: n-heptane
L = 49.3 cm; i.D. = 2mm; $d_\mu$ = 56–90 microns; K = 2.26 × 10⁻⁸ cm²;
T = 24.8°C; $\eta$ = 0.396 cP; P = 16.0 atm; $\mu$ = 1.85 cm/sec.

| Sample | k' | h (mm) | $r_{12}$ (Anthracene) |
|---|---|---|---|
| Benzene | 0.21 | 1.43 | 0.28 |
| Thionaphthene | 0.5 | 2.16 | 0.67 |
| 1,5-Dimethylnaphthalene | 0.39 | 2.5 | 0.53 |
| Acenaphthene | 0.63 | 2.77 | 0.85 |
| 9,10-Dihydrophenanthrene | 0.55 | 2.6 | 0.74 |
| Anthracene | 0.74 | 2.43 | 1.0 |
| Phenanthrene | 0.81 | 2.42 | 1.1 |
| Fluorene | 1.05 | 3.08 | 1.42 |
| Anisole | 0.93 | 2.12 | 1.26 |
| p-Nitrotoluene | 2.85 | 2.87 | 3.85 |
| Hexachlorohexahydro-dimethano-naphthalene | 0.31 | 3.82 | 0.42 |
| Heptachlor | 0.5 | 4.68 | 0.67 |
| Dichlorodiphenyltrichloroethane | 1.34 | 6.0 | 1.81 |
| Ether | 2.12 | 5.42 | 2.86 |
| Acetic acid methyl ester | 4.52 | — | 6.11 |
| 2-Phenylnaphthalene | 0.88 | 3.91 | 1.2 |
| Fluoranthene | 0.92 | 3.95 | 1.24 |
| 1,2-Benzofluorene | 1.05 | 3.22 | 1.42 |

Table 2

Stationary Phase: $-Si-NH-(CH_2)_{17}-CH_3$
Dynamic Phase: n-heptane
L = 50.8 cm; i.D. = 2mm; $d_\mu$ = 56–90 microns;
K = 2.38 × 10⁻⁸ cm²; T = 23.7°C; $\eta$ = 0.400 cP; p = 15.7 atm.;
$\bar{u}$ = 1.85 cm/sec.

| Sample | k' | h (mm) | $r_{12}$ (Anthracene) |
|---|---|---|---|
| Benzene | 0.2 | 1.62 | 0.24 |
| Thionaphthene | 0.56 | 2.35 | 0.66 |
| 1,5-Dimethylnaphthalene | 0.36 | 2.56 | 0.43 |
| Acenaphthene | 0.72 | 3.0 | 0.86 |
| 9,10-Dihydrophenanthrene | 0.56 | 2.78 | 0.66 |
| Anthracene | 0.84 | 3.05 | 1.0 |
| Phenanthrene | 0.82 | 3.3 | 0.97 |
| Fluorene | 1.12 | 3.8 | 1.33 |
| Anisole | 0.72 | 2.0 | 0.86 |
| p-Nitrotoluene | 2.7 | 2.78 | 3.2 |
| Hexachlorohexahydro-dimethano-naphthalene | 0.3 | 3.05 | 0.36 |
| Heptachlor | 0.36 | 3.8 | 0.43 |
| Dichlorodiphenyltrichloroethane | 1.5 | 8.5 | 1.78 |
| Ether | 1.55 | 4.05 | 1.84 |
| Acetic acid methyl ester | 3.34 | 5.2 | 3.97 |
| 2-Phenylnaphthalene | 0.96 | 3.56 | 1.14 |
| Fluoranthene | 1.28 | 3.82 | 1.52 |
| 1,2-Benzofluorene | 1.24 | 3.52 | 1.48 |

$c_2$. Even when water is used as the dynamic phase, excellent separations are obtained, as shown by Tables 3 and 4 below. The clear and symmetrical peaks prove the hydrolysis resistance of the new stationary phases.

Table 3

Stationary Phase: $-Si-NH-(CH_2)_2-CH_3$
Dynamic Phase: water
L = 49.3 cm; i.D. = 2 mm; $d_\mu$ = 56–90 microns;
K = 2.0 × 10⁻⁸ cm²; T = 24.0 °C; $\eta$ = 0.910 cP;
p = 38.0 atm; $\bar{u}$ = 1.7 cm/sec.

| Sample | k' | h (mm) | $r_{12}$ (Gamma-Amino-butyric Acid) |
|---|---|---|---|
| Methanol | 0.08 | 2.37 | 0.57 |
| Ethanol | 0.14 | 3.1 | 1.0 |
| n-Propanol | 0.22 | 3.83 | 1.57 |
| Isopropanol | 0.2 | 3.95 | 1.43 |
| n-Butanol | 0.34 | 5.14 | 2.43 |
| Tert-Butanol | 0.24 | 5.0 | 1.71 |
| n-Amyl alcohol | 0.32 | 6.06 | 2.29 |
| Isoamyl alcohol | 0.65 | — | 4.64 |
| Diethylene glycol | 0.2 | 4.38 | 1.43 |
| Polyethylene glycol 200 | 0.7 | — | 5.0 |
| Dipropylene glycol | 0.44 | 8.4 | 3.14 |
| Ethylene glycol monoethyl ether | 0.33 | 5.42 | 2.36 |
| Ether | 0.63 | 5.32 | 4.5 |
| Dimethylformamide | 0.67 | 6.6 | 4.79 |
| Formic acid ethyl ester | 0.25 | 4.37 | 1.79 |
| Formic acid methyl ester | 0.26 | 3.48 | 1.86 |
| Acetic acid methyl ester | 0.25 | 3.58 | 1.79 |
| Propionic acid methyl ester | 0.31 | 4.83 | 2.21 |
| Butyric acid methyl ester | 0.82 | — | 5.86 |
| Acetonitrile | 0.27 | 2.36 | 1.93 |
| Acetone | 0.36 | 3.77 | 2.57 |
| Phenol | 0.08 | 3.54 | 0.57 |
| Benzyl alcohol | 0.32 | 9.75 | 2.29 |
| 3-Phenylpropanol | 0.47 | 9.47 | 3.36 |
| Benzonitrile | 0.58 | 12.7 | 4.14 |
| p-Toluidine | 0.44 | 10.8 | 3.14 |
| Pyridine | 2.04 | 11.6 | 14.57 |

Table 4

Stationary Phase: —Si—NH—$(CH_2)_{17}$—$CH_3$
Dynamic Phase: water
L = 50.8 cm; i.D. = 2 mm; $d_p$ = 56–90 microns;
K = 2.22 × $10^{-8}$ $cm^2$; T = 23.5 °C; η = 0.922 cP;
p = 39.0 atm; ū = 1.86 cm/sec.

| Sample | k' | h (mm) | $r_{12}$ (Gamma-Amino-butyric acid) |
|---|---|---|---|
| Methanol | 0.06 | 2.94 | 0.25 |
| Ethanol | 0.22 | 4.76 | 0.91 |
| n-Propanol | 0.44 | 7.0 | 1.83 |
| Isopropanol | 0.37 | 6.7 | 1.54 |
| n-Butanol | 0.7 | 7.62 | 2.92 |
| tert-Butanol | 0.48 | 7.7 | 2.0 |
| n-Amyl alcohol | 1.4 | — | 5.83 |
| Isoamyl alcohol | 2.75 | — | 11.46 |
| Diethylene glycol | 0.2 | 5.18 | 0.83 |
| Polyethylene glycol 200 | 0.62 | — | 2.58 |
| Dipropylene glycol | 0.69 | — | 2.88 |
| Ethylene glycol monoethyl ether | 0.56 | 8.7 | 2.33 |
| Ether | 1.36 | — | 5.66 |
| Dimethylformamide | 0.96 | 9.75 | 4.0 |
| Formic acid ethyl ester | 0.6 | 8.2 | 2.5 |
| Formic acid methyl ester | 0.26 | 4.75 | 1.08 |
| Acetic acid methyl ester | 0.38 | 4.94 | 1.56 |
| Propionic acid methyl ester | 1.0 | — | 4.16 |
| Butyric acid methyl ester | 2.16 | — | 9.0 |
| Acetonitrile | 0.22 | 4.42 | 0.91 |
| Acetone | 0.53 | 6.3 | 2.21 |
| Phenol | 0.23 | 4.62 | 0.96 |
| Benzyl alcohol | 1.17 | 9.65 | 4.88 |
| 3-Phenylpropanol | 4.15 | — | 17.3 |
| Benzonitrile | 2.4 | — | 10.0 |
| p-Toluidine | 2.5 | — | 10.41 |
| Pyridine | 4.28 | — | 17.83 |

EXAMPLE 2 a. 10 gm of the chlorinated silica gel of Example 1a is let to stand about 5 hours at 80°C with 30 ml of methylaminopropionitrile. The product obtained is rinsed as in Example 1b) and dried. The adsorbent having —Si—N($CH_3$)—$(CH_2)_2$CN surface groups contains 4.8% C and 1.9% N.

b. Table 5 shows the excellent separation qualities of this new adsorbent. It also proves the hydrolysis-resistance of the new stationary phase and its good separation properties.

Table 5

Stationary Phase: —Si—N($CH_3$)—$(CH_2)_2$—CN
Dynamic Phase: water
L = 49.8 cm; i.D. = 2 mm; $d_p$ = 56–90 microns;
K = 1.92 × $10^{-8}$ $cm^2$; T = 23.5 °C; η = 0.922 cP;
p = 45.0 atm; ū = 1.88 cm/sec.

| Sample | k' | h (mm) | $r_{12}$ (Gamma-Amino-butyric acid) |
|---|---|---|---|
| Methanol | 0.05 | 2.22 | 0.3 |
| Ethanol | 0.13 | 2.85 | 0.76 |
| n-Propanol | 0.2 | 3.7 | 1.18 |
| Isopropanol | 0.19 | 3.75 | 1.12 |
| n-Butanol | 0.26 | 4.73 | 1.53 |
| tert-Butanol | 0.22 | 4.86 | 1.3 |
| n-Amyl alcohol | 0.33 | 5.95 | 1.94 |
| Isoamyl alcohol | 0.55 | 5.3 | 3.24 |
| Diethylene glycol | 0.12 | 4.2 | 0.71 |
| Polyethylene glycol 200 | 0.48 | — | 2.82 |
| Dipropylene glycol | 0.34 | 7.5 | 2.0 |
| Ethylene glycol monoethyl ether | 0.32 | 5.16 | 1.88 |
| Ether | 0.51 | 5.85 | 3.0 |
| Dimethylformamide | 0.62 | 4.75 | 3.65 |
| Formic acid ethyl ester | 0.27 | 3.9 | 1.6 |
| Formic acid methyl ester | 0.19 | 4.32 | 1.13 |

Table 5-Continued

Stationary Phase: —Si—N($CH_3$)—$(CH_2)_2$—CN
Dynamic Phase: water
L = 49.8 cm; i.D. = 2 mm; $d_p$ = 56–90 microns;
K = 1.92 × $10^{-8}$ $cm^2$; T = 23.5 °C; η = 0.922 cP;
p = 45.0 atm; u = 1.88 cm/sec.

| Sample | k' | h (mm) | $r_{12}$ (Gamma-Amino-butyric acid) |
|---|---|---|---|
| Acetic acid methyl ester | 0.25 | 4.46 | 1.47 |
| Propionic acid methyl ester | 0.36 | 5.22 | 2.12 |
| Butyric acid methyl ester | 0.72 | 7.41 | 4.23 |
| Acetonitrile | 0.17 | 2.67 | 1.0 |
| Acetone | 0.33 | 3.45 | 1.94 |
| Acetic acid | 0.38 | 6.2 | 2.24 |

EXAMPLE 3

10 gm of silica gel chlorinated as in Example 1 are reacted with 1 gm of taurine in 80 ml of anhydrous dimethyl sulfoxide for 12 hours at 80°–100°C. Rinsing and drying is performed as in Example 1b).

The analytical values for the product obtained having Si—NH—$(CH_2)_2$—$SO_3$H groups are 1.0% C and 0.3% N per gm of $SiO_2$.

Very symmetrical peaks being formed, liquid chromatography applications prove the highly favorable character of this new stationary phase.

Table 6 shows additional data concerning separation properties.

Table 6

Stationary Phase: —Si—NH—$(CH_2)_2$—$SO_3$H
Dynamic Phase: water
L = 50.0 cm; i.D. = 2 mm; $d_p$ = 50–90 microns;
K = 1.58 × $10^{-8}$ $cm^2$; T = 23.8 °C; η = 0.913 cP;
p = 53.4 atm; ū = 1.85 cm/sec.

| Sample | k' | h (mm) | $r_{12}$ (Gamma-Amino-butyric acid) |
|---|---|---|---|
| Methanol | 0.03 | 2.45 | 0.1 |
| Ethanol | 0.1 | 3.22 | 0.33 |
| n-Propanol | 0.16 | 4.33 | 0.53 |
| Isopropanol | 0.16 | 4.2 | 0.53 |
| n-Butanol | 0.21 | 4.84 | 0.7 |
| tert-Butanol | 0.2 | 5.24 | 0.66 |
| n-Amyl alcohol | 0.24 | 5.73 | 0.8 |
| Isoamyl alcohol | 0.38 | 7.58 | 1.26 |
| Diethylene glycol | 0.14 | 4.17 | 0.46 |
| Polyethylene glycol 200 | 0.54 | — | 1.8 |
| Dipropylene glycol | 0.39 | 7.8 | 1.3 |
| Ethylene glycol monoethyl ether | 0.3 | 5.53 | 1.0 |
| Ether | 0.66 | 6.64 | 2.2 |
| Dimethylformamide | 0.54 | 5.4 | 1.8 |
| Formic acid ethyl ester | 0.27 | 3.91 | 0.9 |
| Formic acid methyl ester | 0.225 | 3.78 | 0.75 |
| Acetic acid methyl ester | 0.27 | 4.0 | 0.9 |
| Propionic acid methyl ester | 0.34 | 4.93 | 1.13 |
| Butyric acid methyl ester | 0.58 | 6.78 | 1.92 |
| Acetonitrile | 0.19 | 3.15 | 0.63 |
| Acetone | 0.4 | 4.12 | 1.33 |

EXAMPLE 4 a. 50 gm of silicon dioxide chlorinated as in Example 1a are added to 150 ml of water-free ethylene diamine. The mixture is boiled for about 6 hours at 80°–100°C. Rinsing and drying is performed as in Example 1b. The product obtained has a content of 3.1% C and 2.6% N.

b. In similar manner, diatomaceous earth (Chromosorb) coated with porous $SiO_2$ having a specific surface of 80 m²/g, a pore diameter of 80 A, and a particle size of 37.50 microns, is reacted to become a stationary phase having Si—NH—(CH$_2$)$_2$—NH$_2$ groups. Analysis: 0.7% C and 0.6% N.

c. Chromatographic application of the adsorbent according to Example 4a takes place in the column described in Table 1. The following substances especially evidenced high values for the capacity ratio, $k'$:

| Sample | $k'$ |
| --- | --- |
| Acenaphthene | 1.38 |
| 9,10-Dihydrophenanthrene | 1.23 |
| Anthracene | 1.8 |
| Phenanthrene | 1.82 |
| Fluorene | 2.58 |
| Anisole | 1.4 |
| p-Nitroluene | 5.1 |
| Heptachlor | 1.03 |
| Dichlorodiphenyltrichloroethane | 3.56 |
| Ether | 1.56 |
| Acetic acid methyl ester | 4.6 |
| Formic acid methyl ester | 3.62 |
| Propionic acid methyl ester | 4.5 |

EXAMPLE 5

Five gm of the chlorinated product obtained from Example 1a are reacted in the presence of 80 ml of anhydrous dimethyl sulfoxide at 80°–100°C for 12 hours, with a. 2.5 gm of 4-aminobutyric acid
b. 5.0 gm of 11-aminohendecanoic acid Analytical results:

|   | % C | % N |
| --- | --- | --- |
| a) | 1.6 | 1.45 |
| b) | 3.5 | 0.3 |

The substances were tested as stationary phases in the column described in Example 1c$_1$ and showed good separation qualities.

EXAMPLE 6

Five gm of the product obtained as in Example 4a having Si—NH—(CH$_2$)$_2$—NH$_2$ groups are reacted with each of the following carbonyl compounds for 6 hours under reflux in 30 ml of benzene:

| Carbonyl Compound | Amount (gm) | Analysis % C | N |
| --- | --- | --- | --- |
| Benzaldehyde | 1.0 | 2.0 | 0.8 |
| p-Nitrobenzaldehyde | 1.5 | 3.35 | 1.75 |
| p-Cyanobenzaldehyde | 1.5 | 2.5 | 0.9 |
| p-Carboxybenzaldehyde | 1.5 | 2.3 | 0.5 |
| 4-Pyridine aldehyde | 1.0 | 4.3 | 2.2 |

The reactions may also be carried out in toluene, dioxane, or n-heptane.

The products obtained are finished as in Example 1b.

The new stationary phases are tested in the column described in Table 1. Heptane, methylene chloride, enthanol and water, among others, can be used as dynamic phases. With heptane as a dynamic phase, products having nitro groups are particularly well suited for separating aromatic compounds.

EXAMPLE 7

Five gm of the product obtained from Example 4a having Si—NH—(CH$_2$)$_2$—NH$_2$ groups are reacted in 30 ml of dioxane or n-heptane for 6 hours at 90°C with each of the following compounds:

| Halide | Amount (gm) | Analysis %C | %N |
| --- | --- | --- | --- |
| Bromopropionitrile | 1.5 | 1.7 | 0.3 |
| 4-Bromomethylbenzonitrile | 2.0 | 0.8 | 0.5 |
| p-Nitrobenzyl chloride | 2.0 | 8.6 | 1.8 |

The obtained products are finished as in Example 1b.

The new stationary phases are tested in the column described in Table 1. Heptane, methylene chloride, methanol and water, among others, are used as dynamic phases. The stationary phases having nitro groups are particularly well suited for separating aromatic hydrocarbons. The measured values show, illustratively, good separations for a mixture of benzene, 1,5-dimethylnaphthalene, acenaphthene, and phenanthrene (n-heptane as the dynamic phase).

EXAMPLE 8 a. 50 gm of a thoroughly porous silica gel (having a specific surface of 60 m²/g, an average pore diameter of 2–400 A, a pore volume of 0.7 ml/g, and a particle size of 37–50 microns) are chlorinated as in Example 1a.

b. The product obtained is reacted as in Example 2a with methylaminopropionitrile. The new adsorbent contains 0.3%C and 1.9%N.

EXAMPLE 9

Fifty gm of glass spheres having a surface coating of SiO$_2$, deposited by means of a silica sol, (having a specific surface of 4 m²/g, an average pore diameter of 80 A, and a particle size of 50–71 microns) are chlorinated as in Example 1a and then reacted with ethylene diamine as in Example 4a. The adsorbent is hydrolysis-resistant in the pH range of 4–8 and has good separation qualities.

EXAMPLE 10 a. 10 gm of the chlorinated silica gel obtained from Example 1a are reacted with 2 gm of 3-phenylpropylamine in 40 ml of anhydrous diethyl ether as in Example 1b and finished.

b. The product obtained is sulfonated with 5 ml of chlorosulfonic acid in 40 ml of anhydrous chloroform at room temperature for 24 hours, then is rinsed several times with chloroform and treated further as in Example 1b. This product possesses cation exchange groups.

EXAMPLE 11 a. 10 gm of the product obtained from Example 1a, i.e., chlorinated silica gel, are reacted with allylamine as in Example 1b.

b. 3 gm of styrene dissolved in 40 ml of xylene are added to the above product and 50 mg of dibenzoyl peroxide are added as catalyst. Following a 2-hour long polymerisation at 80°C, the product is rinsed several times with benzene and methanol and dried under vacuum of 0.1 torr at 80°C. An adsorbent having good separating qualities is obtained.

EXAMPLE 13 a. As in Example 1b, 10 gm of the chlorinated silica gel obtained from Example 1a are reacted with hexamethylenediamine. Following finishing, one obtains a product having 2.8% C and 1.1% N.

Table 7 shows the separation qualities.

Table 7

Stationary Phase: $-Si-NH-(CH_2)_6-NH_2$
Dynamic Phase: water
L = 50.3 cm; i.D. = 2 mm; $d_p$ = 56–90 microns;
K = 1.48 × $10^{-8}$ $cm^2$; T = 23.8°C; $\eta$ = 0.913 cP;
p = 56.0 atm; $\bar{u}$ = 1.8 cm/sec.

| Sample | k' | h (mm) | $r_{12}$ (Gamma-Aminobutyric acid) |
|---|---|---|---|
| Methanol | 0.0 | 2.83 | 0.0 |
| Ethanol | 0.07 | 3.5 | 0.35 |
| n-Propanol | 0.1 | 4.55 | 0.5 |
| Isopropanol | 0.14 | 4.62 | 0.7 |
| n-Butanol | 0.23 | 5.55 | 1.15 |
| tert-Butanol | 0.2 | 5.32 | 1.0 |
| n-Amyl alcohol | 0.26 | 6.38 | 1.3 |
| Isoamyl alcohol | 0.28 | 8.6 | 1.4 |
| Diethylene glycol | 0.14 | 4.2 | 0.7 |
| Dipropylene glycol | 0.28 | 6.61 | 1.4 |
| Ethylene glycol monoethyl ether | 0.26 | 4.9 | 1.3 |
| Formic acid ethyl ester | 0.2 | 4.0 | 1.0 |
| Acetic acid methyl ester | 0.2 | 3.4 | 1.0 |
| Acetonitrile | 0.12 | 2.68 | 0.6 |
| Acetone | 0.28 | 3.31 | 1.4 |
| Gamma-Aminobutyric acid | 0.2 | 4.5 | 1.0 |
| dl-gamma-Aminoisobutyric acid | 0.31 | 7.32 | 1.55 |
| Betaine | 0.24 | 6.74 | 1.2 |
| dl-Threonine | 0.38 | — | 1.9 | b. The product obtained from Example 13a is reacted with acetylacetone as in Example 6. An adsorbent having 3.1% C and 1.4% N is obtained.

EXAMPLE 14

Ten gm of chlorinated silica gel are reacted with 2 gm of 2,4-dinitrophenylhydrazine in 40 ml of dried dioxane at 80°C for about 8 hours, excluding air humidity. Post treatment is an in Example 1b. The product so obtained contains 3.6% C and 2.5% N.

In similarity of this process, other hydrazine derivatives can be reacted with chlorinated silicon dioxides, for instance:
N,N-dimethylhydrazine
N,N-dioctylhydrazine
N,N-bis-(3-cyanopropyl)-hydrazine
N-benzylhydrazine

We claim:

1. A porous silicon dioxide-based absorbent for chromatography having a surface modified by chemical conversion of silanol groups, said absorbent characterized in that its surface is modified by primary or secondary, aliphatic or araliphatic amines having from two to twenty carbon atoms and lacking any reactive hydroxy groups, said amines being bound onto said surface by means of a SiN linkage.

2. An adsorbent according to claim 1 wherein said amines are substituted in the omega-position by at least one non-competitive functional group.

3. An adsorbent according to claim 1 wherein said amine is ethylene diamine.

4. An adsorbent according to claim 1 wherein said amine is a diamine, the terminal amino group of which is further altered by chemical reaction with compounds comprising a reactive component and inert end groups or additional functional groups selected from the group consisting of $-CN$, $-COOH$, $-NO_2$, $-SO_3H$, quaternary ammonium, $-NH_2$, and substituted amino groups.

5. An adsorbent according to claim 1 wherein said porous silicon dioxide comprises particles having a specific surface of at least 100 $cm^2/g$ and a pore diameter of at least 30 A.

6. A process for manufacturing porous silicon dioxide-based adosrbents for chromatography having surfaces modified by chemical conversion adsorbents silanol groups, said process comprising the steps of halogenating the silanol groups of the porous silicon dioxide and, thereafter, reacting the halogenated surface with a primary or secondary, aliphatic or araliphatic amine having from two to twenty carbon atoms and lacking any reactive hydroxy groups.

7. A process according to claim 6 wherein said amine is substituted in the omega-position by at least one non-competitive functional group.

8. A process according to claim 6 wherein said amine is ethylene diamine.

9. In a process according to claim 6 wherein said amine is a diamine, the additional step of reacting the terminal amino group of the diamine with a compound comprising a reactive component and an inert end group or additional functional groups selected from the group consisting of $-CN$, $-COOH$, $-NO_2$, $-SO_3H$, quaternary ammonium, $-NH_2$, and substituted amino groups.

10. A process according to claim 6 wherein said porous silicon dioxide comprises particles having a specific surface of at least 100 $cm^2/g$. and a pore diameter of at least 30 A.

* * * * *